United States Patent
Lee

(10) Patent No.: US 10,490,834 B2
(45) Date of Patent: Nov. 26, 2019

(54) APPARATUS AND METHOD FOR CONTROLLING FUEL CELL STACK

(71) Applicant: Hyundai Motor Company, Seoul (KR)

(72) Inventor: Jung Jae Lee, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 724 days.

(21) Appl. No.: 15/228,634

(22) Filed: Aug. 4, 2016

(65) Prior Publication Data

US 2017/0301937 A1  Oct. 19, 2017

(30) Foreign Application Priority Data

Apr. 18, 2016  (KR) .................. 10-2016-0047124

(51) Int. Cl.
| | |
|---|---|
| *H01M 8/04992* | (2016.01) |
| *H01M 8/0432* | (2016.01) |
| *H01M 8/04537* | (2016.01) |
| *H01M 8/04701* | (2016.01) |
| *H01M 8/04746* | (2016.01) |

(52) U.S. Cl.
CPC ..... *H01M 8/04992* (2013.01); *H01M 8/0432* (2013.01); *H01M 8/04552* (2013.01); *H01M 8/04559* (2013.01); *H01M 8/04701* (2013.01); *H01M 8/04753* (2013.01); *H01M 2250/20* (2013.01); *Y02P 70/56* (2015.11)

(58) Field of Classification Search
CPC .......... H01M 8/0432; H01M 8/04552; H01M 8/04559; H01M 8/04701; H01M 8/04992
See application file for complete search history.

(56) References Cited

U.S. PATENT DOCUMENTS

| | | | | |
|---|---|---|---|---|
| 2008/0038594 A1* | 2/2008 | Lai | ..................... | H01M 8/04126 429/413 |
| 2010/0040913 A1* | 2/2010 | Son | ..................... | H01M 8/0444 429/492 |
| 2010/0159340 A1* | 6/2010 | Oomori | ............. | H01M 8/04253 429/432 |

(Continued)

FOREIGN PATENT DOCUMENTS

| | | |
|---|---|---|
| JP | 2005-235614 A | 9/2005 |
| JP | 2007-265937 A | 10/2007 |

(Continued)

OTHER PUBLICATIONS

Marignetti et al., Measuring the PEM Fuel Cell Performance in a Versatile Test Station, Nov. 2009, 2009 35th Annual Conference of IEEE Industrial Electronics (Year: 2009).*

*Primary Examiner* — Janet L Suglo
*Assistant Examiner* — Liam R Casey
(74) *Attorney, Agent, or Firm* — Mintz Levin Cohn Ferris Glovsky and Popeo, P.C.; Peter F. Corless

(57) ABSTRACT

An apparatus and a method for controlling a fuel cell stack are provided to improve the performance (output) of the fuel cell stack that has suffered from deterioration. The performance is improved by adjusting a stoichiometric ratio (SR) of air supplied to the fuel cell stack and an operating temperature of the fuel cell stack based on the basis of an open-circuit decay time (ODT) indicating a time taken for a cell voltage to be reduced from a reference voltage to a threshold voltage when the supply of air to the fuel cell stack is cut off.

11 Claims, 7 Drawing Sheets

(56) References Cited

U.S. PATENT DOCUMENTS

| | | | |
|---|---|---|---|
| 2011/0136031 A1* | 6/2011 | Sato | H01M 8/0432 |
| | | | 429/442 |
| 2011/0183226 A1* | 7/2011 | Nishiyama | H01M 8/04335 |
| | | | 429/450 |
| 2012/0034542 A1* | 2/2012 | Martin | H01M 8/0273 |
| | | | 429/457 |
| 2013/0073180 A1* | 3/2013 | Murase | F01N 3/01 |
| | | | 701/102 |
| 2014/0081497 A1 | 3/2014 | Jeon et al. | |
| 2015/0278704 A1* | 10/2015 | Kim | H01M 8/04992 |
| | | | 703/2 |

FOREIGN PATENT DOCUMENTS

| | | |
|---|---|---|
| JP | 2012-079410 A | 4/2012 |
| JP | 2012-138176 A | 7/2012 |
| JP | 2012-227008 A | 11/2012 |
| JP | 2013-196765 A | 9/2013 |
| KR | 10-2009-0050649 | 5/2009 |
| KR | 10-2014-0037724 A | 3/2014 |

\* cited by examiner

APPARATUS AND METHOD FOR CONTROLLING FUEL CELL STACK

CROSS-REFERENCE TO RELATED APPLICATION

This application is based on and claims the benefit of priority to Korean Patent Application No. 10-2016-0047124, filed on Apr. 18, 2016, in the Korean Intellectual Property Office, the disclosure of which is incorporated herein in its entirety by reference.

TECHNICAL FIELD

The present disclosure relates to an apparatus and a method for controlling a fuel cell stack and, more particularly, to a technology for improving the performance of a fuel cell stack that has been reduced due to deterioration, based on an open-circuit decay time (ODT) indicating a time taken for a cell voltage to be reduced from a reference voltage to a threshold voltage when the supply of air to the fuel cell stack is cut off.

BACKGROUND

A fuel cell is a device that produces electricity by converting chemical energy from a fuel into electrical energy through an electrochemical reaction within a fuel cell stack, instead of converting the chemical energy from the fuel into heat through combustion. Fuel cells may provide power for industries, households, and vehicles, and may also be applied to power supply for small electric/electronic products, especially, portable devices.

Currently, proton exchange membrane fuel cells (PEM-FCs), also known as polymer electrolyte membrane fuel cells, having the highest power density among fuel cells are being studied as a power source for driving vehicles. The PEMFCs have a rapid startup time and a quick power conversion response time due to a low operating temperature. Such a PEMFC includes: a membrane electrode assembly (MEA) having catalyst electrode layers, in which an electrochemical reaction occurs, attached to both sides of a solid polymer electrolyte membrane through which hydrogen ions move; gas diffusion layers (GDLs) serving to uniformly distribute reactant gases and deliver electrical energy that is generated; gaskets and coupling members for maintaining air tightness of the reactant gases and a coolant and appropriate clamping pressure; and bipolar plates allowing the reactant gases and the coolant to move therethrough.

When such unit cells are assembled to form a fuel cell stack, a combination of main components, MEA and GDL, is positioned in the innermost portion of the cell. The MEA includes the catalyst electrode layers, i.e., an anode and a cathode with a catalyst coated on both surfaces of the polymer electrolyte membrane to allow hydrogen and oxygen to react with each other. The GDLs, the gaskets, and the like are stacked on the anode and the cathode in the outer portion of the cell. The bipolar plates having respective flow fields formed therein are positioned outwardly of the GDLs, the flow fields supplying the reactant gases (e.g., hydrogen as a fuel and oxygen or air as an oxidizing agent) and allowing the coolant to pass therethrough.

After the plurality of unit cells having the above-described configuration are stacked, current collectors, insulating plates, and end plates for supporting the stacked cells are combined in the outermost portion of the stack. The unit cells are repeatedly stacked and assembled between the end plates to form the fuel cell stack. To obtain an electric potential required in a vehicle, it is necessary to stack the number of unit cells corresponding to the required amount of electric potential energy, and the stacked unit cells are called a stack. For example, an electric potential generated from a single unit cell is about 1.3V, and to generate power required for driving a vehicle, the plurality of cells may be stacked in series.

Such a fuel cell stack suffers from deterioration as the driving time, mileage, and the frequency of starting of a vehicle are increased. However, this is not a temporary deterioration resulting from a dry or flooding state, but deterioration in the membrane of the stack itself, which may reduce the output of the fuel cell stack to lower fuel-efficiency and limit the launching performance of the vehicle. Conventionally, when the fuel cell stack suffers from deterioration, part of the cells within the fuel cell stack are repaired or replaced to recover the performance thereof. Such a conventional method may be a fundamental solution, but the disassembly and assembly of the fuel cell stack consumes a lot of time and incurs replacement costs.

SUMMARY

The present disclosure provides an apparatus and a method for controlling a fuel cell stack that improves the performance (output) of the fuel cell stack that has suffered from deterioration, by adjusting a stoichiometric ratio (SR) of air supplied to the fuel cell stack and an operating temperature of the fuel cell stack based on an open-circuit decay time (ODT) indicating a time taken for a cell voltage to be reduced from a reference voltage (for example, about 1V) to a threshold voltage (for example, about 0.75V) when the supply of air to the fuel cell stack is cut off.

The object of the present disclosure is not limited to the foregoing object, and any other objects and advantages not mentioned herein will be clearly understood from the following description. The present inventive concept will be more clearly understood from exemplary embodiments of the present disclosure. In addition, it will be apparent that the objects and advantages of the present disclosure can be achieved by the elements claimed in the claims and a combination thereof.

According to an aspect of the present disclosure, an apparatus for controlling a fuel cell stack may include: a map storage configured to store an air SR map in which a target air SR of the stack that corresponds to ODT is recorded, an operating temperature map in which a target operating temperature of the stack that corresponds to an outdoor temperature is recorded, and an operating temperature offset map in which a target operating temperature offset of the stack that corresponds to ODT is recorded; a sensor configured to detect an outdoor temperature; an ODT measurer configured to measure a time (ODT) taken for a cell voltage to be reduced from a reference voltage to a threshold voltage when the supply of air to the stack is cut off; and a fuel cell controller configured to detect a target operating temperature of the stack that corresponds to the outdoor temperature detected by the sensor and detect a target air SR of the stack and a target operating temperature offset of the stack that corresponds to ODT measured by the ODT measurer, based on the air SR map, the operating temperature map, and the operating temperature offset map.

According to another aspect of the present disclosure, a method for controlling a fuel cell stack may include: storing, by a map storage, an air SR map in which a target air SR of the stack that corresponds to ODT is recorded, an operating temperature map in which a target operating temperature of the stack that corresponds to an outdoor temperature is recorded, and an operating temperature offset map in which a target operating temperature offset of the stack that corresponds to ODT is recorded; detecting, by a sensor, an outdoor temperature; detecting, by a fuel cell controller, a target operating temperature of the stack that corresponds to the detected outdoor temperature based on the operating temperature map; measuring, by an ODT measurer, a time (ODT) taken for a cell voltage to be reduced from a reference voltage to a threshold voltage when the supply of air to the stack is cut off; and detecting, by the fuel cell controller, a target air SR of the stack and a target operating temperature offset of the stack that corresponds to the measured ODT, based on the air SR map and the operating temperature offset map.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
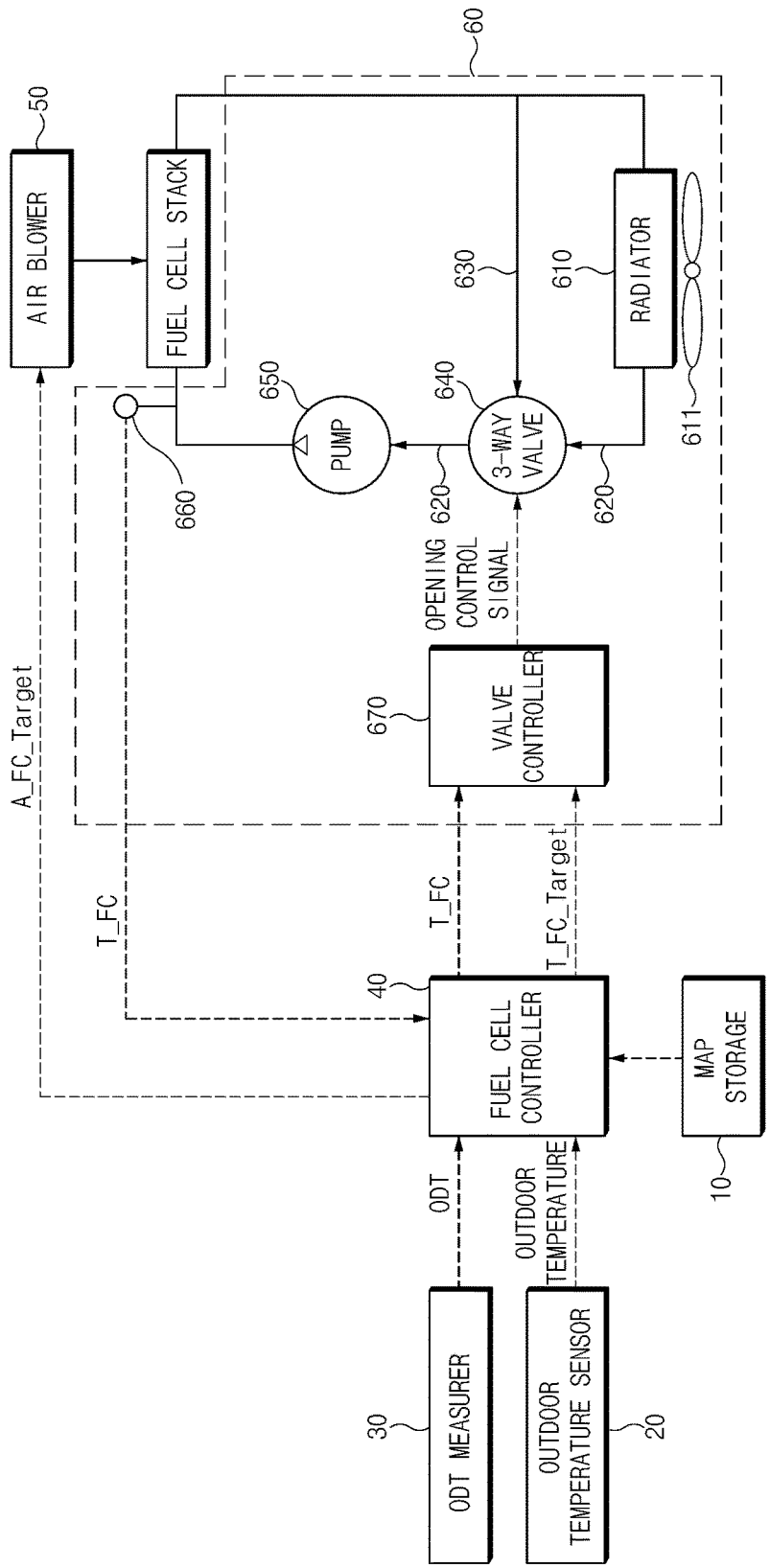
FIG. 1 illustrates the configuration of an apparatus for controlling a fuel cell stack, according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The above and other objects, features and advantages of the present disclosure will be more clearly understood from the following detailed description taken in conjunction with the accompanying drawings so that those skilled in the art to which the present disclosure pertains can easily carry out technical ideas described herein. In addition, a detailed description of well-known techniques associated with the present disclosure will be ruled out in order not to unnecessarily obscure the gist of the present disclosure. Hereinafter, exemplary embodiments of the present disclosure will be described in detail with reference to the accompanying drawings.

FIG. 1 illustrates the configuration of an apparatus for controlling a fuel cell stack, according to an exemplary embodiment of the present disclosure. As illustrated in FIG. 1, the apparatus for controlling a fuel cell stack, according to the exemplary embodiment of the present disclosure, may include a map storage 10, an outdoor temperature sensor 20, an open-circuit decay time (ODT) measurer 30, a fuel cell controller 40, an air blower 50, and a temperature controller 60.

With respect to each of the aforementioned elements, first, the map storage 10 may be configured to store a map (hereinafter referred to as the "air SR map") in which a target air stoichiometric ratio (SR) of the stack that corresponds to ODT is recorded, a map (hereinafter referred to as the "operating temperature map") in which a target operating temperature of the stack that corresponds to an outdoor temperature is recorded, and a map (hereinafter referral to as the "operating temperature offset map") in which a target operating temperature offset of the stack that corresponds to ODT is recorded.

In this exemplary embodiment of the present disclosure, the map storage 10 may be provided as a separate module;

however, in some exemplary embodiments, the fuel cell controller 40 may be configured to include the map storage 10. Hereinafter, the air SR map, the operating temperature map, and the operating temperature offset map will be detailed with reference to FIGS. 2 to 4.

Figure 2:
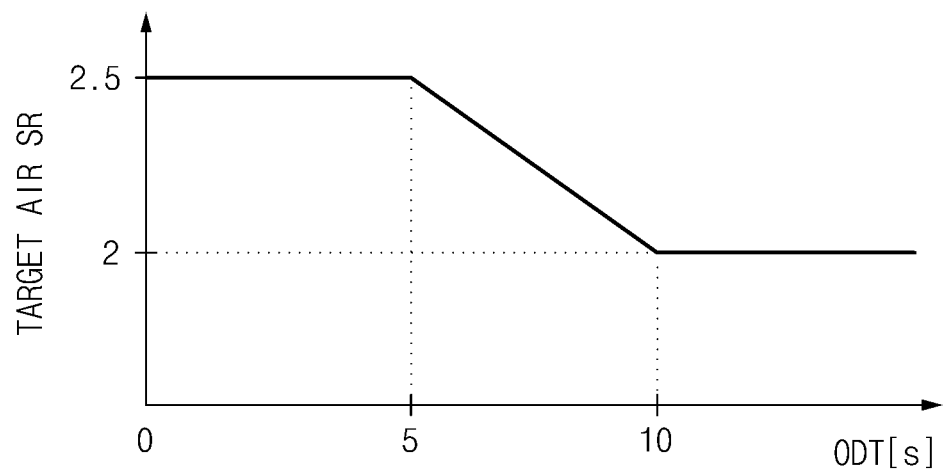
FIG. 2 illustrates an air SR map, according to an exemplary embodiment of the present disclosure.

FIG. 2 illustrates an example of the air SR map, according to an exemplary embodiment of the present disclosure. As illustrated in FIG. 2, when ODT is less than or equal to about ten seconds, the fuel cell stack may be determined to be suffering from deterioration and a target air SR of the stack may be increased. By increasing the target air SR of the stack, the performance of the stack may be improved.

For example, when ODT is less than or equal to about five seconds, the degree of deterioration of the fuel cell stack may be determined severe, the target air SR of the stack may be set to 2.5; when ODT exceeds five seconds and is less than or equal to about ten seconds, the target air SR of the stack may be linearly reduced from 2.5 to 2; and when ODT exceeds ten seconds, the degree of deterioration of the stack may be determined to be insignificant, the target air SR of the stack may be set to 2. Particularly, ODT reference points (five seconds, ten seconds) for determining the target air SR of the stack, and the target air SR of the stack that corresponds thereto may be changed based on a designer's intention.

Figure 3:
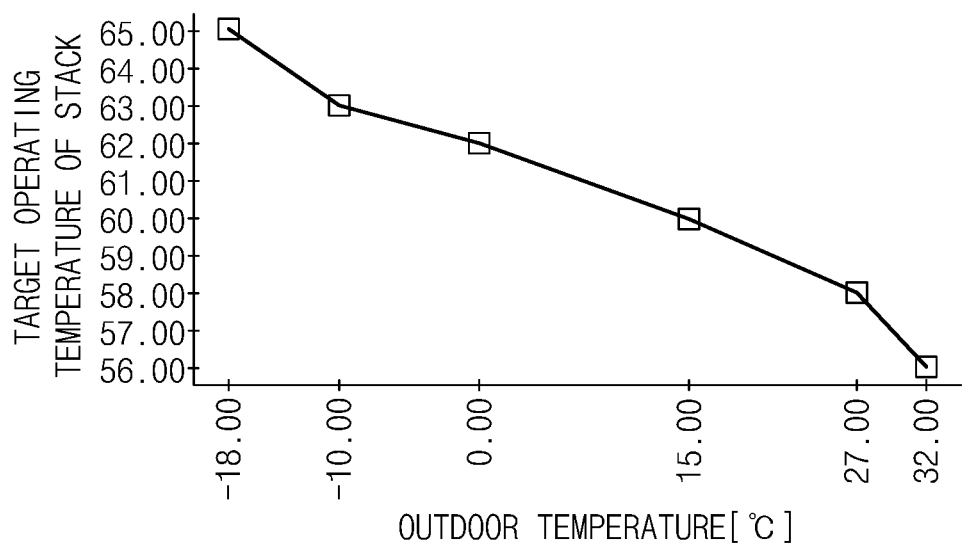
FIG. 3 illustrates an operating temperature map, according to an exemplary embodiment of the present disclosure.

FIG. 3 illustrates an example of the operating temperature map, according to an exemplary embodiment of the present disclosure. As illustrated in FIG. 2, according to exemplary embodiments of the present disclosure, a target operating temperature of the stack may be set based on outdoor temperatures.

For example, when the outdoor temperature is about −18° C., the target operating temperature of the stack may be set to about 65° C.; when the outdoor temperature is about −10° C., the target operating temperature of the stack may be set to about 63° C.; when the outdoor temperature is about 0° C., the target operating temperature of the stack may be set to about 62° C.; when the outdoor temperature is about 15° C., the target operating temperature of the stack may be set to about 60° C.; when the outdoor temperature is about 27° C., the target operating temperature of the stack may be set to about 58° C.; and when the outdoor temperature is about 32° C., the target operating temperature of the stack may be set to about 56° C.

Figure 4:
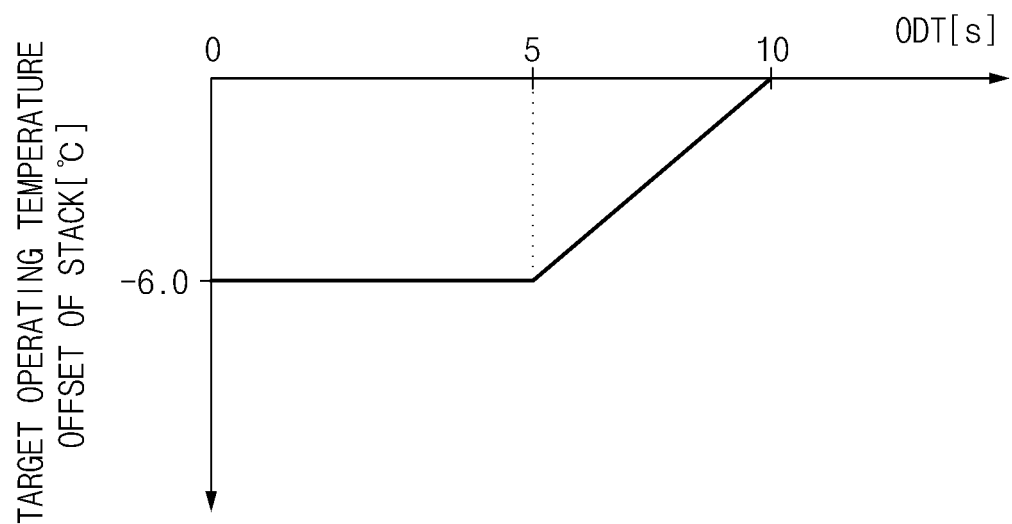
FIG. 4 illustrates an operating temperature offset map, according to an exemplary embodiment of the present disclosure.

FIG. 4 illustrates an example of the operating temperature offset map, according to an exemplary embodiment of the present disclosure. As illustrated in FIG. 4, according to exemplary embodiments of the present disclosure, when ODT is less than or equal to about ten seconds, the fuel cell stack may be determined to be suffering from deterioration, the target operating temperature offset may be set to a minus value. By setting a target operating temperature offset to a minus value (e.g., a negative value) to reduce a target operating temperature and increase a relative humidity, the performance of the stack may be improved.

For example, when ODT is less than or equal to about five seconds, the degree of deterioration of the fuel cell stack may be determined to be severe, the target operating temperature offset of the stack may be set to about −6.0° C.; when ODT exceeds about five seconds and is less than or equal to about ten seconds, the target operating temperature offset of the stack may be linearly increased from about −6.0° C. to 0° C.; and when ODT exceeds about ten seconds, the degree of deterioration of the stack may be determined to be insignificant, the target operating temperature offset of the stack may be set to about 0° C. Particularly, ODT reference points (e.g., about five seconds, ten seconds) for determining the target operating temperature offset, and the target operating temperature offset that corresponds thereto may be changed based on a designer's intention.

Meanwhile, when the target operating temperature offset is about 0° C., the target operating temperature may not be varied. In other words, although the target operating temperature offset of about 0° C. may be added to the target operating temperature, this results in the target operating temperature. Further, the outdoor temperature sensor 20 may be configured to detect an outdoor temperature. The ODT measurer 30 may be configured to measure a time (hereinafter referred to as "DDT") taken for a cell voltage to be reduced from a reference voltage (for example, about 1V) to a threshold voltage (for example, about 0.75V) when the supply of air to the stack is cut off. The ODT may be used as a criterion for estimating the degree of deterioration of the stack. Particularly, the supply of air may be cut by the fuel cell controller 40.

The fuel cell controller 40 may be configured to operate the aforementioned respective elements to perform the functions thereof normally. In particular, the fuel cell controller 40 may be configured to detect a target operating temperature of the stack that corresponds to the outdoor temperature detected by the outdoor temperature sensor 20, and a target air SR of the stack and a target operating temperature offset of the stack that corresponds to ODT measured by the ODT measurer 30, based on the air SR map, the operating temperature map, and the operating temperature offset map stored in the map storage 10.

In other words, the fuel cell controller 40 may be configured to detect the target air SR of the stack that corresponds to ODT measured by the ODT measurer 30 based on the air SR map stored in the map storage 10, detect the target operating temperature of the stack that corresponds to the outdoor temperature detected by the outdoor temperature sensor 20 based on the operating temperature map stored in the map storage 10, and detect the target operating temperature offset of the stack that corresponds to ODT measured by the ODT measurer 30 based on the operating temperature offset map stored in the map storage 10.

In addition, the fuel cell controller 40 may be configured to detect and record ODT in real time while the vehicle is being driven, using an internal variable, "Std_OdtTi". The air blower 50 may be configured to supply air to the fuel cell stack based on the target air SR (A_FC_Target) of the stack detected by the fuel cell controller 40. The temperature controller 60 may be configured to set a final target operating temperature of the stack by adding the target operating temperature offset of the stack detected by the fuel cell controller 40 to the target operating temperature of the stack detected by the fuel cell controller 40, and adjust an operating temperature of the fuel cell stack based on the final target operating temperature. In particular, the temperature controller 60 may be configured to receive the final target operating temperature of the stack from the fuel cell controller 40.

For example, when the target operating temperature of the stack is about 60° C. and the target operating temperature offset of the stack is about −6.0° C., the final target operating temperature of the stack may be about 54° C. For example, the temperature controller 60 may include a radiator 610 and a cooling fan 611 for dissipating heat of a coolant externally, a coolant line 620 connected between the fuel cell stack and the radiator 610 to allow the coolant to circulate, a bypass line 630 bypassing the radiator 610 to prevent the coolant from passing through the radiator 610, a 3-way valve 640 that adjusts an amount of the coolant passing through the radiator 610 and the bypass line 630, a pump 650 that pumps the coolant from the coolant line 620, a water temperature sensor 660 configured to detect a stack inlet coolant temperature (T_FC), and a valve controller 670.

The 3-way valve 640 may be an electronic valve of which the opening is adjusted based on an electrical signal (a control signal) from an external controller. In particular, the electronic valve may be an electronic thermostat using a wax pellet or an electronic 3-way valve driven by a solenoid or a motor and of which the opening may be adjusted. The opening control of the 3-way valve 640 may depend on the control signal output from the valve controller 670. The valve controller 670 may be configured to receive a stack inlet coolant temperature target value (T_FC_Target) and a stack inlet coolant temperature (T_FC) from the fuel cell controller 40, and adjust the opening of the 3-way valve 640 based on the received values to allow the stack inlet coolant temperature to reach the target value. The stack inlet coolant temperature target value may indicate the final target operating temperature of the stack.

When the opening of the 3-way valve 640 is adjusted by the angular rotation of a valve body by the motor, the valve controller 670 may be configured to apply a motor control signal for adjusting a rotation angle (e.g., an opening angle) of the valve body to the 3-way valve 640. When the amount of the coolant passing through the radiator 610 and the bypass line 630 is adjusted by the 3-way valve 640, the temperature of the coolant supplied to the fuel cell stack, i.e., the stack inlet coolant temperature may be adjusted, and thus, the operating temperature of the fuel cell stack may be adjusted.

In addition, the stack inlet coolant temperature (T_FC) detected in real time by the water temperature sensor 660 may be input to the fuel cell controller 40, and the fuel cell controller 40 may be configured to receive an outdoor temperature detection signal from the outdoor temperature sensor 20. In this exemplary embodiment of the present disclosure, the fuel cell controller 40 and the valve controller 670 are provided as separate modules by way of example; however, the fuel cell controller 40 and the valve controller 670 may be provided as a single integrated controller configured to receive output signals from the ODT measurer 30, the water temperature sensor 660, and the outdoor temperature sensor 20, calculate the stack inlet coolant temperature target value (T_FC_Target), and directly operate and adjust the 3-way valve 640. Particularly, the stack inlet coolant temperature target value (T_FC_Target) may be used for adjusting the opening of the 3-way valve 640, and the opening of the 3-way valve 640 may be adjusted based on the target value and the stack inlet coolant temperature value (T_FC) detected by the water temperature sensor 660.

Figure 5:
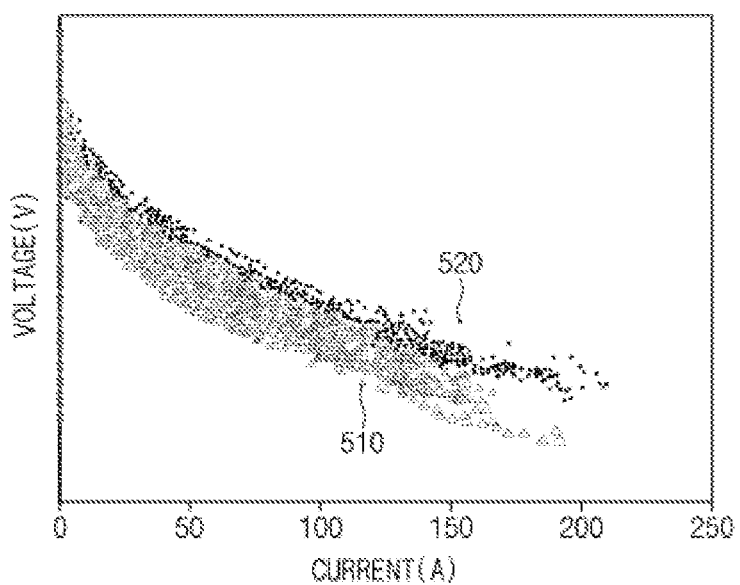
FIG. 5 illustrates the analysis of performance of a fuel cell stack controlled by a novel method according to an exemplary embodiment of the present disclosure.

FIG. 5 illustrates the analysis of performance of a fuel cell stack controlled by a novel method according to an exemplary embodiment of the present disclosure. In FIG. 5, "510" denotes the performance of a fuel cell stack that was controlled by a conventional method, and "520" denotes the performance of a fuel cell stack that was controlled by a novel method according to an exemplary embodiment of the present disclosure. As seen in FIG. 5, the fuel cell stack 520 controlled by the novel method according to the exemplary embodiment of the present disclosure output higher voltage than that of the fuel cell stack 510 that was controlled by the conventional method, at the same current. In other words, FIG. 5 shows that the performance of the fuel cell stack 520 controlled by the novel method according to the exemplary embodiment of the present disclosure showed substantial improvement compared to the conventional method.

Specifically, when a target operating temperature of the stack was reduced by about 6° C. and a target air SR was increased by about 0.2 compared to the corresponding conditions of the conventional method, the following results compared to the results of the conventional method were obtained: the operating temperature of the stack was reduced by about 5.94° C., the air SR of the stack was increased by about 0.08, the relative humidity was increased by about 8.29%, and the fuel-efficiency was increased by about 1.4%. In particular, the conditions of the conventional method indicate that the target operating temperature of the stack was not reduced by 6° C., and the target air SR was not increased by 0.2.

Figure 6:
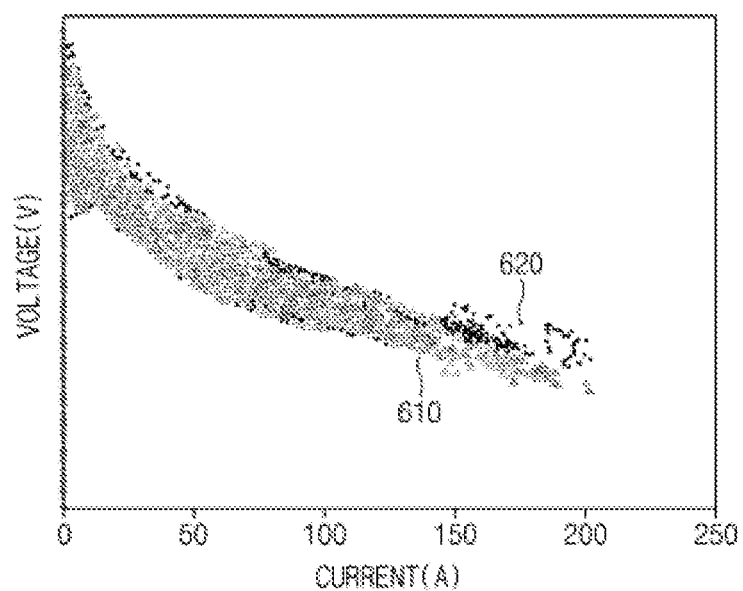
FIG. 6 illustrates the analysis of performance of a fuel cell stack controlled by a novel method according to another exemplary embodiment of the present disclosure.

FIG. 6 illustrates the analysis of performance of a fuel cell stack controlled by a novel method according to an exemplary embodiment of the present disclosure. In FIG. 6, "610" denotes the performance of a fuel cell stack that was controlled by a conventional method, and "620" denotes the performance of a fuel cell stack that was controlled by a novel method according to an exemplary embodiment of the present disclosure. As seen in FIG. 6, the fuel cell stack 620 controlled by the novel method according to the exemplary embodiment of the present disclosure output higher voltage than that of the fuel cell stack 610 controlled by the conventional method, at the same current. In other words, FIG. 6 shows that the performance of the fuel cell stack 620 controlled by the novel method according to the exemplary embodiment of the present disclosure showed substantial improvement compared to the conventional method.

Specifically, when a target operating temperature of the stack was reduced by about 6° C. and a target air SR was increased by about 0.2 compared to the corresponding conditions of the conventional method, the following results compared to the results of the conventional method were obtained: the operating temperature of the stack was reduced by about 8.22° C., the air SR of the stack was increased by about 0.15, the relative humidity was increased by about 10.48%, and the fuel-efficiency was increased by about 2.3%. Under the same conditions, the reason why the experimental results shown in FIG. 5 and the experimental results shown in FIG. 6 differ from each other is that the degree of deterioration of the fuel cell stack used in the experimentation of FIG. 5 and the degree of deterioration of the fuel cell stack used in the experimentation of FIG. 6 differ from each other.

Figure 7:
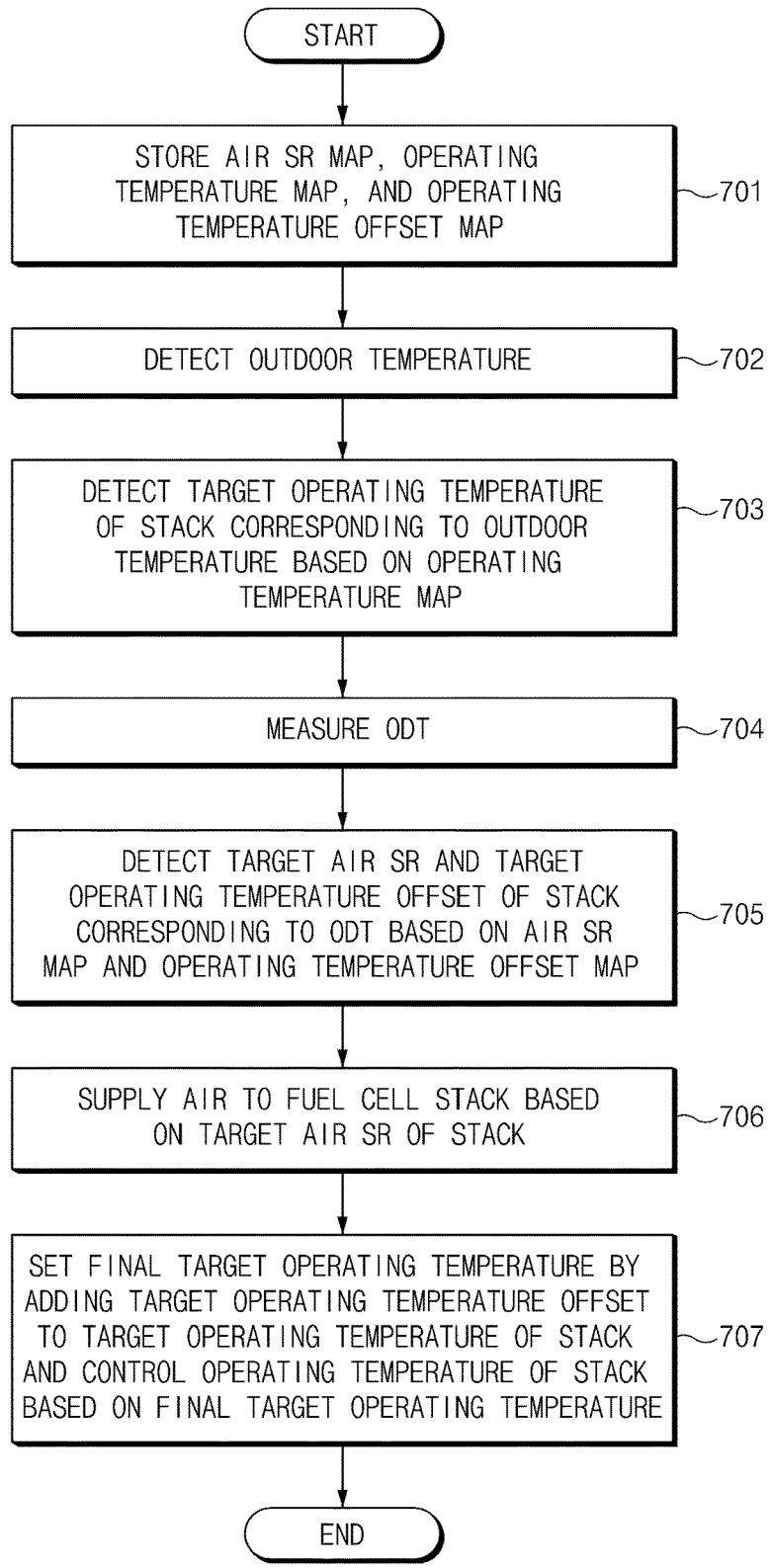
FIG. 7 illustrates a flowchart of a method for controlling a fuel cell stack, according to an exemplary embodiment of the present disclosure.

FIG. 7 illustrates a flowchart of a method for controlling a fuel cell stack, according to an exemplary embodiment of the present disclosure. First, the map storage 10 may be configured to store an air SR map in which a target air SR of the stack that corresponds to ODT is recorded, an operating temperature map in which a target operating temperature of the stack that corresponds to an outdoor temperature is recorded, and an operating temperature offset map in which a target operating temperature offset of the stack that corresponds to ODT is recorded, in operation 701.

Further, the outdoor temperature sensor 20 may be configured to detect an outdoor temperature in operation 702. The fuel cell controller 40 may be configured to detect a target operating temperature of the stack that corresponds to the outdoor temperature detected by the outdoor temperature sensor 20 based on the operating temperature map in operation 703. Then, the ODT measurer 30 may be configured to measure a time (ODT) taken for a cell voltage to be reduced from a reference voltage to a threshold voltage when the supply of air to the stack is cut off, in operation 704.

Thereafter, the fuel cell controller 40 may be configured to detect a target air SR of the stack and a target operating temperature offset of the stack that corresponds to ODT measured by the ODT measurer 30 based on the air SR map and the operating temperature offset map in operation 705. The air blower 50 may then be configured to supply the air to the fuel cell stack based on the target air SR of the stack in operation 706. Then, the temperature controller 60 may be configured to set a final target operating temperature by adding the target operating temperature offset to the target operating temperature of the stack, and adjust an operating temperature of the stack based on the final target operating temperature in operation 707.

Meanwhile, the above-stated method according to the exemplary embodiment of the present disclosure may be written as a computer program. Codes and code segments constituting the program may easily be inferred by a computer programmer skilled in the art. In addition, the written program may be stored in a computer-readable recording medium (an information storage medium) and be read and executed by a computer, thereby implementing the method according to the exemplary embodiment of the present disclosure. The recording medium includes all types of computer-readable recording media.

As set forth above, the apparatus and the method for controlling a fuel cell stack may improve the performance (output) of the fuel cell stack that has suffered from deterioration, by adjusting a stoichiometric ratio (SR) of air supplied to the fuel cell stack and an operating temperature of the fuel cell stack based on an open-circuit decay time (ODT) indicating a time taken for a cell voltage to be reduced from a reference voltage (for example, about 1V) to a threshold voltage (for example, about 0.75V) when the supply of air to the fuel cell stack is cut off. In addition, by applying the present inventive concept to a fuel cell vehicle, fuel-efficiency of the fuel cell vehicle may be improved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling a fuel cell stack, comprising:
  a map storage configured to store an air stoichiometric ratio (SR) map in which a target air SR of the stack that corresponds to open-circuit decay time (ODT) is recorded, an operating temperature map in which a target operating temperature of the stack that corresponds to an outdoor temperature is recorded, and an operating temperature offset map in which a target operating temperature offset of the stack that corresponds to ODT is recorded;
  a sensor configured to detect an outdoor temperature;
  an ODT measurer configured to measure a time taken for a cell voltage to be reduced from a reference voltage to a threshold voltage when a supply of air to the stack is cut off; and
  a fuel cell controller configured to detect a target operating temperature of the stack that corresponds to the outdoor temperature detected by the sensor and detect a target air SR of the stack and a target operating temperature offset of the stack that corresponds to ODT measured by the ODT measurer, based on the air SR map, the operating temperature map, and the operating temperature offset map.

2. The apparatus according to claim 1, further comprising:
  an air blower configured to supply the air to the fuel cell stack based on the target air SR of the stack; and
  a temperature controller configured to set a final target operating temperature by adding the target operating temperature offset to the target operating temperature of the stack, and adjust an operating temperature of the stack based on the final target operating temperature.

3. The apparatus according to claim 1, wherein the air SR map is characterized by setting the target air SR of the stack to a first reference value when ODT is less than or equal to a first critical time, setting the target air SR of the stack to a second reference value when ODT exceeds a second critical time, and linearly reducing the target air SR of the stack from the first reference value to the second reference value when ODT exceeds the first critical time and is less than or equal to the second critical time.

4. The apparatus according to claim 1, wherein the operating temperature offset map is characterized by setting the target operating temperature offset of the stack to a first reference temperature when ODT is less than or equal to a first critical time, setting the target operating temperature offset of the stack to a second reference temperature when ODT exceeds a second critical time, and linearly reducing the target operating temperature offset of the stack from the first reference temperature to the second reference temperature when ODT exceeds the first critical time and is less than or equal to the second critical time.

5. A method for controlling a fuel cell stack, comprising:
  storing, by a map storage, an air stoichiometric ratio (SR) map in which a target air SR of the stack that corresponds to open-circuit decay time (ODT) is recorded, an operating temperature map in which a target operating temperature of the stack that corresponds to an outdoor temperature is recorded, and an operating temperature offset map in which a target operating temperature offset of the stack that corresponds to ODT is recorded;
  detecting, by a sensor, an outdoor temperature;
  detecting, by a fuel cell controller, a target operating temperature of the stack that corresponds to the detected outdoor temperature based on the operating temperature map;
  measuring, by an ODT measurer, a time taken for a cell voltage to be reduced from a reference voltage to a threshold voltage when supply of air to the stack is cut off; and
  detecting, by the fuel cell controller, a target air SR of the stack and a target operating temperature offset of the stack that corresponds to the measured ODT based on of the air SR map and the operating temperature offset map.

6. The method according to claim 5, further comprising:
  supplying, by an air blower, the air to the fuel cell stack based on the target air SR of the stack; and
  setting, by a temperature controller, a final target operating temperature by adding the target operating temperature offset to the target operating temperature of the stack, and adjusting an operating temperature of the stack based on the final target operating temperature.

7. The method according to claim 5, wherein the air SR map is characterized by setting the target air SR of the stack to a first reference value when ODT is less than or equal to a first critical time, setting the target air SR of the stack to a second reference value when ODT exceeds a second critical time, and linearly reducing the target air SR of the stack from the first reference value to the second reference value when ODT exceeds the first critical time and is less than or equal to the second critical time.

8. The method according to claim 5, wherein the operating temperature offset map is characterized by setting the target operating temperature offset of the stack to a first reference temperature when ODT is less than or equal to a first critical time, setting the target operating temperature offset of the stack to a second reference temperature when ODT exceeds a second critical time, and linearly reducing the target operating temperature offset of the stack from the first reference temperature to the second reference temperature when ODT exceeds the first critical time and is less than or equal to the second critical time.

9. A non-transitory computer readable medium containing program instructions executed by a controller for controlling a fuel cell stack, the computer readable medium comprising:
   program instructions that store an air stoichiometric ratio (SR) map in which a target air SR of the stack that corresponds to open-circuit decay time (ODT) is recorded, an operating temperature map in which a target operating temperature of the stack that corresponds to an outdoor temperature is recorded, and an operating temperature offset map in which a target operating temperature offset of the stack that corresponds to ODT is recorded;
   program instructions that detect, using a sensor, an outdoor temperature;
   program instructions that detect a target operating temperature of the stack that corresponds to the detected outdoor temperature based on the operating temperature map;
   program instructions that measure a time taken for a cell voltage to be reduced from a reference voltage to a threshold voltage when supply of air to the stack is cut off; and
   program instructions that detect a target air SR of the stack and a target operating temperature offset of the stack that corresponds to the measured ODT based on of the air SR map and the operating temperature offset map.

10. The non-transitory computer readable medium of claim 9, wherein the air SR map is characterized by setting the target air SR of the stack to a first reference value when ODT is less than or equal to a first critical time, setting the target air SR of the stack to a second reference value when ODT exceeds a second critical time, and linearly reducing the target air SR of the stack from the first reference value to the second reference value when ODT exceeds the first critical time and is less than or equal to the second critical time.

11. The non-transitory computer readable medium of claim 9, wherein the operating temperature offset map is characterized by setting the target operating temperature offset of the stack to a first reference temperature when ODT is less than or equal to a first critical time, setting the target operating temperature offset of the stack to a second reference temperature when ODT exceeds a second critical time, and linearly reducing the target operating temperature offset of the stack from the first reference temperature to the second reference temperature when ODT exceeds the first critical time and is less than or equal to the second critical time.

* * * * *